US009615150B2

(12) United States Patent
Kashiwagi et al.

(10) Patent No.: US 9,615,150 B2
(45) Date of Patent: Apr. 4, 2017

(54) COMMUNICATION DEVICE AND SMART METER

(71) Applicant: KABUSHIKI KAISHA TOSHIBA, Minato-ku, Tokyo (JP)

(72) Inventors: Ippei Kashiwagi, Tokyo (JP); Ko Katsurahara, Tokyo (JP); Makoto Tabata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/049,760

(22) Filed: Feb. 22, 2016

(65) Prior Publication Data

US 2017/0064416 A1    Mar. 2, 2017

(30) Foreign Application Priority Data

Aug. 26, 2015    (JP) ................................. 2015-166685

(51) Int. Cl.
*G08B 29/00*    (2006.01)
*H04Q 9/00*    (2006.01)

(52) U.S. Cl.
CPC ........... *H04Q 9/00* (2013.01); *H04Q 2209/40* (2013.01)

(58) Field of Classification Search
CPC ... G06F 1/1616; G06F 1/1698; H01Q 1/2266; H01Q 21/28
USPC ...................................... 343/702; 340/870.02
See application file for complete search history.

(56) References Cited

U.S. PATENT DOCUMENTS

| 6,426,723 | B1 | 7/2002 | Smith et al. | |
|---|---|---|---|---|
| 2002/0024469 | A1* | 2/2002 | Masaki | G06F 1/1616 343/702 |
| 2002/0033774 | A1 | 3/2002 | Ha et al. | |
| 2004/0227677 | A1 | 11/2004 | Asano et al. | |
| 2006/0049994 | A1* | 3/2006 | Ide | H01Q 1/243 343/702 |
| 2007/0139271 | A1* | 6/2007 | Pelzer | H01Q 1/243 343/700 MS |
| 2007/0273595 | A1* | 11/2007 | Shimasaki | G06F 1/1616 343/702 |

(Continued)

FOREIGN PATENT DOCUMENTS

| JP | 2003-163521 A | 6/2003 |
|---|---|---|
| JP | 2005-260732 A | 9/2005 |

(Continued)

OTHER PUBLICATIONS

Great Britain Combined Search and Examination Report dated Jul. 19, 2016 as issued in corresponding Great Britain Application No. 1602377.2.

*Primary Examiner* — Ojiako Nwugo
(74) *Attorney, Agent, or Firm* — Foley & Lardner LLP

(57) ABSTRACT

One embodiment is a communication device in which different wireless systems whose frequency bands are close to each other are installed. For a first wireless system, a first antenna using a first frequency band is provided. For a second wireless system, a second antenna using a second frequency band is provided. The first frequency band is set in a range wider than the second frequency band. The second frequency band is included in a part of the range of the first frequency band. An imaginary surface extending along the first antenna and an imaginary surface extending along the second antenna cross each other on their extension lines.

10 Claims, 6 Drawing Sheets

(56) References Cited

U.S. PATENT DOCUMENTS

| | | | |
|---|---|---|---|
| 2009/0073060 A1 | 3/2009 | Shimasaki et al. | |
| 2010/0039232 A1 | 2/2010 | Chang et al. | |
| 2010/0182206 A1 | 7/2010 | Barbieri et al. | |
| 2010/0328166 A1* | 12/2010 | Ohguchi | H01Q 1/2266 343/702 |
| 2011/0013347 A1* | 1/2011 | Kinjou | G06F 1/1616 361/679.01 |
| 2011/0273352 A1* | 11/2011 | You | H01Q 9/42 343/834 |
| 2012/0075164 A1 | 3/2012 | Shimasaki et al. | |
| 2013/0063306 A1 | 3/2013 | Yang | |
| 2013/0147672 A1* | 6/2013 | Desclos | H01Q 9/06 343/745 |
| 2015/0084831 A1* | 3/2015 | Liu | H01Q 21/24 343/893 |

FOREIGN PATENT DOCUMENTS

| | | |
|---|---|---|
| JP | 2006-080721 A | 3/2006 |
| JP | 2007-037170 A | 2/2007 |
| JP | 2007-318678 A | 12/2007 |
| JP | 2008-011016 A | 1/2008 |
| KR | 1020080058534 A | 6/2008 |
| WO | WO-99/03166 A1 | 1/1999 |
| WO | WO-01/48860 A1 | 7/2001 |
| WO | WO-2013/001327 A1 | 1/2013 |
| WO | WO-2015/061396 A1 | 4/2015 |

* cited by examiner

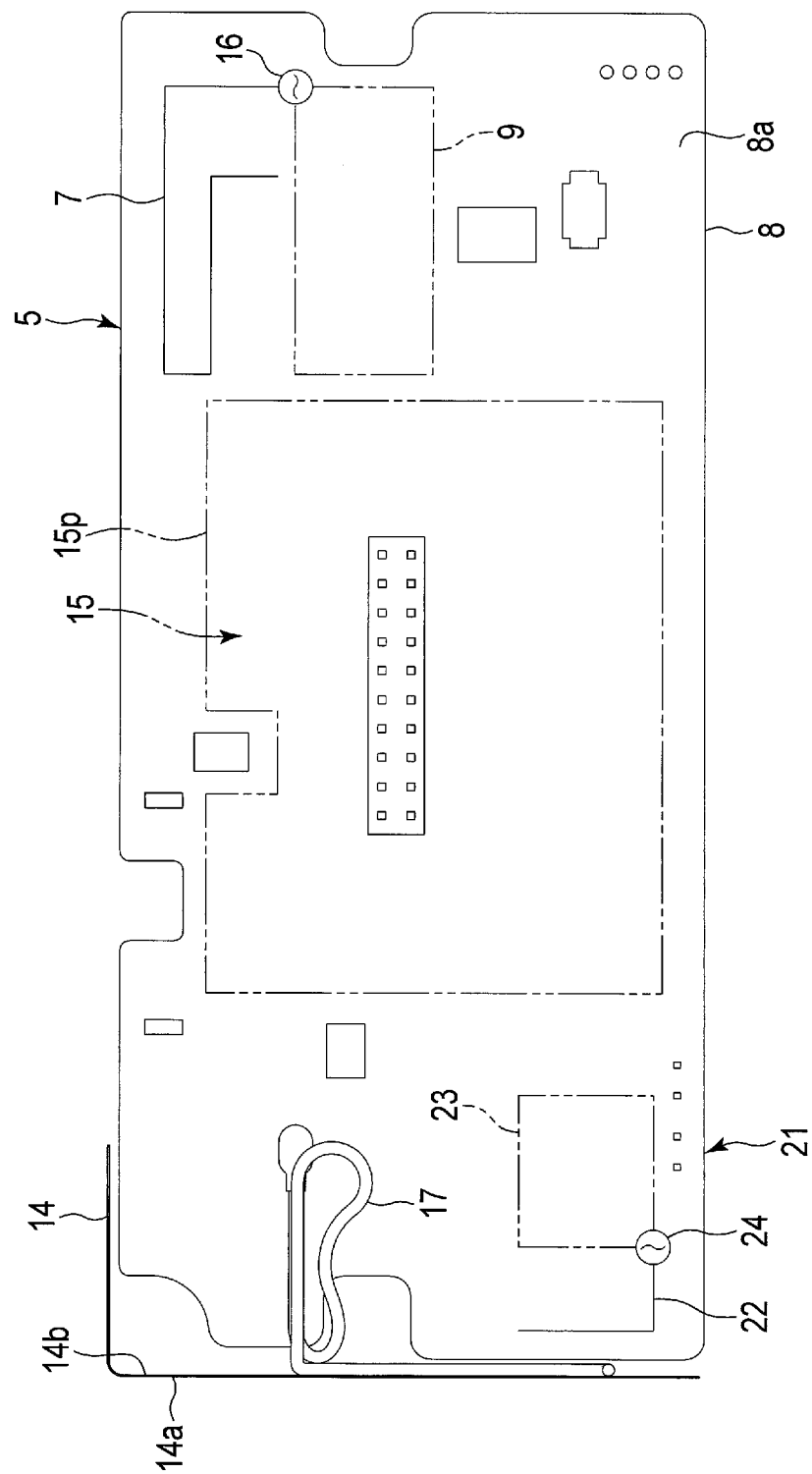
F I G. 5

COMMUNICATION DEVICE AND SMART METER

CROSS-REFERENCE TO RELATED APPLICATIONS

This application is based upon and claims the benefit of priority from Japanese Patent Application No. 2015-166685, filed Aug. 26, 2015, the entire contents of which are incorporated herein by reference.

FIELD

Embodiments described herein relate generally to a communication device and a smart meter comprising the communication device.

BACKGROUND

Communication devices in which a plurality of wireless systems are installed are known. It is required that the communication devices be made smaller. In a small communication device, antennas used in respective wireless systems must be mounted at high density. In the high-density mounting, if the frequency bands of the antennas are close to each other, the antenna performance may not be maintained because of mutual radio interference.

Mounting antennas at high density with a reduction in the size of a communication device and maintaining the antenna performance in the high-density mounting are so-called antinomic physical phenomena, and it is hard to achieve them together.

Embodiments described herein aims to provide a small communication device in which the antenna performance can be maintained while different wireless systems whose frequency bands are close to each other can be mounted at high density.

An embodiment is a communication device in which different wireless systems whose frequency bands are close to each other are installed. The communication device comprises a first wireless system and a second wireless system. In the first wireless system, a first antenna using a first frequency band is provided. In the second wireless system, a second antenna using a second frequency band is provided. The first frequency band is set in a range wider than the second frequency band. The second frequency band is included in a part of the range of the first frequency band. An imaginary surface extending along the first antenna and an imaginary surface extending along the second antenna cross each other on their extension lines.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary plan view showing a configuration of a surface of a first board of FIG. 1.

DETAILED DESCRIPTION

Various embodiments will be described hereinafter with reference to the accompanying drawings. In general, according to one embodiment is a communication device in which different wireless systems whose frequency bands are close to each other are installed. For a first wireless system, a first antenna using a first frequency band is provided. For a second wireless system, a second antenna using a second frequency band is provided. The first frequency band is set in a range wider than the second frequency band. The second frequency band is included in a part of the range of the first frequency band. An imaginary surface extending along the first antenna and an imaginary surface extending along the second antenna cross each other on their extension lines.

One Embodiment

A communication device of a present embodiment is configured to be applicable to, for example, an energy meter equipped with a communication function, that is, a smart meter, although not shown in the figures. The smart meter, for example, measures consumed energy of household electrical appliances, etc., and enables the measurement to be transmitted to a power company or the household electrical appliances to be controlled remotely.

Figure 1:
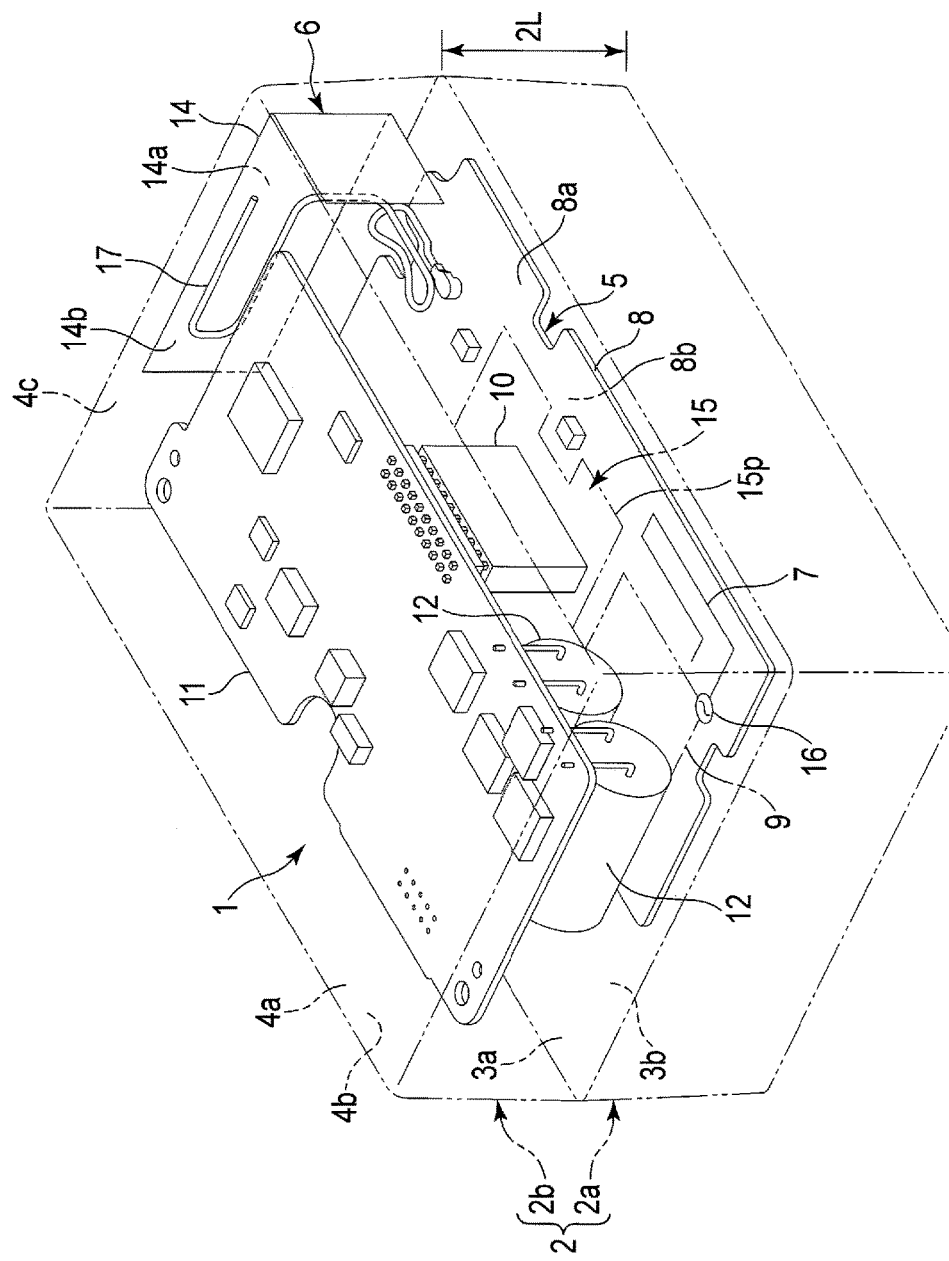
FIG. 1 is an exemplary perspective view showing a communication device according to one embodiment.
Figure 2:
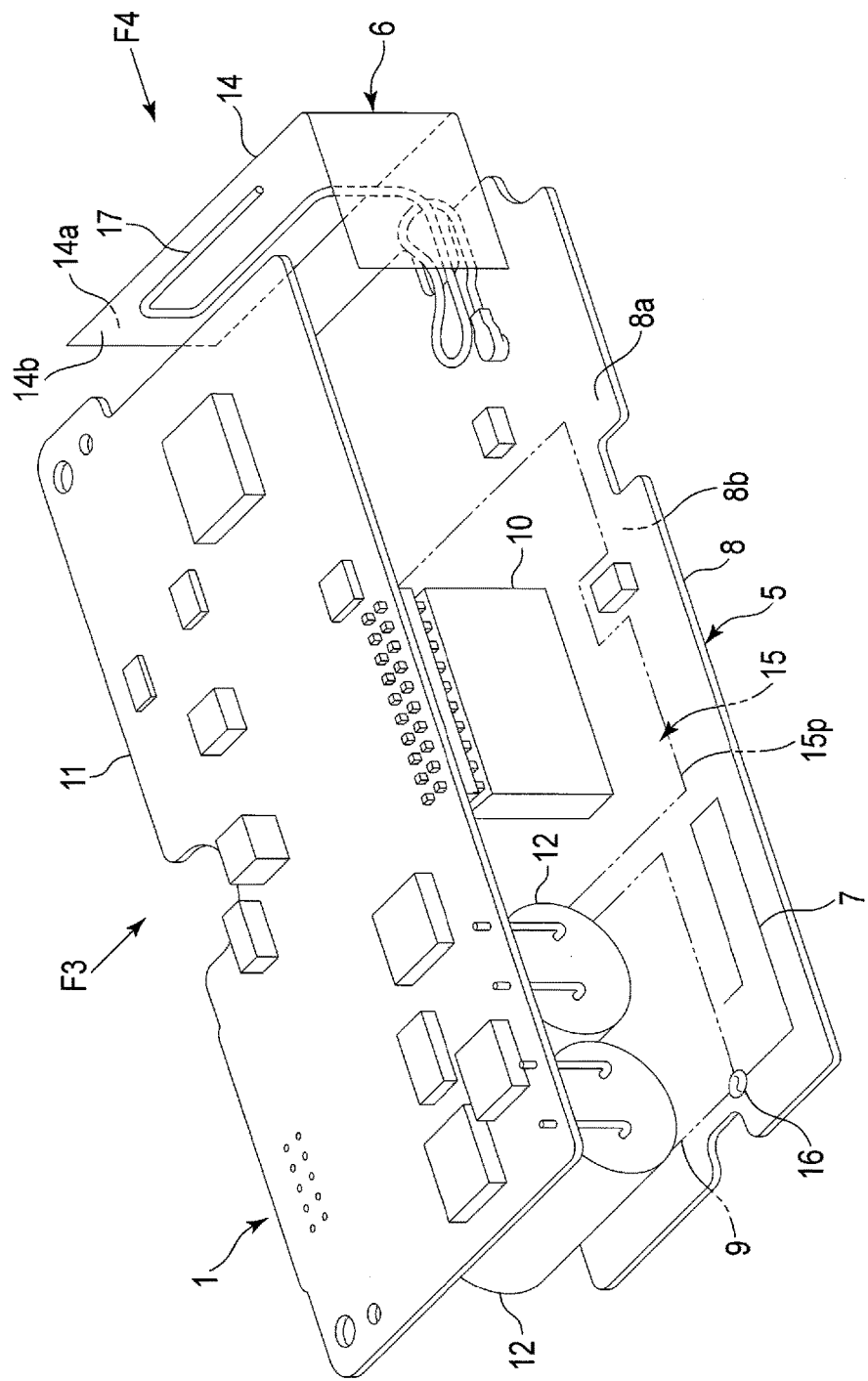
FIG. 2 is an exemplary perspective view showing a configuration of wireless systems installed in the communication device of FIG. 1.
Figure 3:
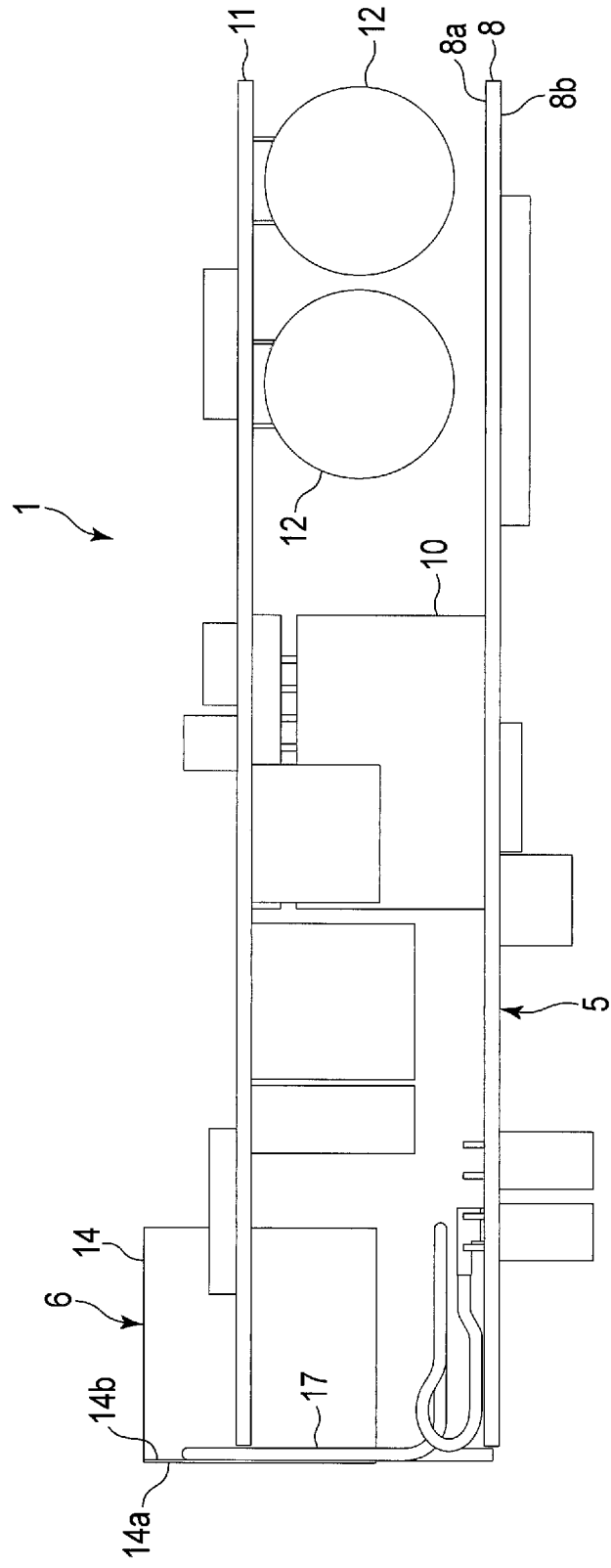
FIG. 3 is an exemplary side view of the wireless systems in a direction indicated by arrow F3 of FIG. 2.

FIG. 1 shows a communication device 1 applied to the smart meter. The communication device 1 can be accommodated in a cover unit 2. The cover unit 2 is attachable to a predetermined attachment place (for example, a place adjacent to the energy meter) not shown in the figures in a state in which it accommodates the communication device 1. The cover unit 2 is formed of a material excellent in durability and waterproof property. The cover unit 2 comprises a base 2a and a cover 2b.

The base 2a is attachable to the above-described attachment place. The base 2a comprises a front face 3a and a back face 3b facing each other. On the front face 3a side of the base 2a, the communication device 1 can be placed. The back face 3b side of the base 2a has a hollow three-dimensional structure.

The cover 2b comprises a surface 4a and an inner face 4b facing each other. The inner face 4b of the cover 2b is formed to be depressed in the shape of a depression. The inner face 4b of the cover 2b is formed to be able to cover the front face 3a side of the base 2a. In a state in which the front face 3a of the base 2a is covered by the inner face 4b of the cover 2b, an accommodation space, which can accommodate the communication device 1, is formed between the inner face 4b of the cover 2b and the front face 3a of the base 2a. The surface 4a of the cover 2b is formed to expand in the shape of a projection along the inner face 4b in the shape of a depression. Although the figure shows the cover unit 2 having a rectangular three-dimensional shape as an example, the cover unit 2 may have other shapes.

In the communication device 1, its structural components can be placed to be apportioned between the front face 3a of the base 2a and the inner face 4b of the cover 2b. The figure shows, as an example, the communication device 1 in which different wireless systems whose frequency bands are close to each other are installed. The wireless systems include, for example, a broadband wireless system and a narrowband wireless system. As a broadband wireless system in Japan, a multiband wireless system for high-speed communication (3G/LTE) whose available frequency bands are 800 MHz and 1.5, 1.7, and 2 GHz, for example, can be assumed. On the other hand, as a narrowband wireless system in Japan, a single-band specific low-power wireless system whose available frequency band is 920 MHz, for example, can be assumed.

Moreover, as a broadband wireless system in Europe, a multiband wireless system for high-speed communication (30/LTE) whose available frequency bands are 800 MHz and 2.1 GHz, for example can be assumed. On the other hand, as a narrowband wireless system in Europe, a single-band specific low-power wireless system whose available frequency band is 869 MHz, for example, can also be assumed.

Here, for example, if a broadband wireless system is installed in the front face 3a of the base 2a, a narrowband wireless system can be installed in the inner face 4b of the cover 2b. In this case, the cover unit 2, in which the communication device 1 is installed, is attached to the above-described attachment place. That is, the base 2a of the cover unit 2 is attached to the attachment place. In this state, the front face 3a of the base 2a and the inner face 4b of the cover 2b covering the front face 3a are positioned to be separate from the attachment portion.

The wireless systems (for example, a broadband wireless system and a narrowband wireless system) placed to be apportioned between the front face 3a of the base 2a and the inner face 4b of the cover 2b are thereby also positioned to be separate from the attachment place. As a result, each of the wireless systems can be less affected by a communication (radio) failure from the attachment place.

Because a distance (that is, a clearance) 2L for which the wireless systems are separated from the attachment place is set according to, for example, the kinds of the wireless systems, the state of the attachment place, and the degree of a communication (radio) failure, its numerical value is not particularly limited herein. As an example, in the specifications of the communication device 1 according to the embodiment, which will be described later, the distance 2L is set at approximately 40 to 50 mm.

[Communication Device 1]

As shown in FIG. 1 to FIG. 6, the communication device 1 comprises a first wireless system 5 and a second wireless system 6. The first wireless system 5 is installed in the above-described front face 3a of the base 2a. The first wireless system 5 corresponds to the above-described broadband wireless system (3G/LTE). The second wireless system 6 is installed in the above-described inner face 4b of the cover 2b. The second wireless system 6 corresponds to the above-described narrowband wireless system (869 MHz).

The first wireless system 5 comprises a first antenna 7, a first board 8 (for example, a printed circuit board), and a first wireless circuit 9. The first antenna 7 uses a first frequency band. The first frequency band corresponds to a frequency band used in the above-described wireless system for high-speed communication (3G/LTE). The first antenna 7 is mounted on the first board 8. The first wireless circuit 9 is provided on the first board 8. The first wireless circuit 9 uses the first frequency band as an operating frequency. The first board 8 is electrically connected to a sub-board 11 (also referred to as a third board) via a connector 10. The sub-board (third board) 11 is placed to face the first board 8, and is provided with circuits and various control circuits.

The second wireless system 6 comprises a second antenna 13 (see FIG. 6), a second board 14 (for example, a printed circuit board), and a second wireless circuit (not shown in the figures). The second antenna 13 uses a second frequency band. The second frequency band corresponds to a frequency band (869 MHz) used in the above-described specific low-power wireless system. The second antenna 13 is mounted on the second board 14. The second wireless circuit can be provided on the above-described first board 8 or second board. The second wireless circuit uses the second frequency band as an operating frequency.

Here, in the first wireless system 5, the first frequency band used in the first antenna 7 is a wide frequency band covering the 800-MHz and 2.1-GHz bands. Here, the 800-MHz band is specifically a frequency band of 824 to 894 MHz, and the first antenna 7 covers the frequency band. On the other hand, in the second wireless system 6, the second frequency band used in the second antenna 13 is a pinpoint frequency band specified as the above-described 869-MHz band. In this case, in the relationship between the first frequency band and the second frequency band, the second frequency band is included in a part of the frequency band of 824 to 894 MHz of the first frequency band. In other words, the second frequency band has an overlapping relationship with the first frequency band.

Although the operating frequency bands of the first wireless system 5, the first antenna 7, the second wireless system 6, and the second antenna 13, which are set in a communication device 1 for Europe, have been herein described, other bands can be set in communication devices 1 for other regions.

In the present embodiment, it is assumed that the frequency bands of the wireless systems 5 and 6 installed in the communication device 1 are close to each other. For example, if both the frequency bands are relatively included in a range of ±40%, wireless systems using the frequency bands can be regarded as close to each other. Then, in the range of ±40% of the second frequency band, the first frequency band is included. The first wireless system 5 corresponding to the first frequency band and the second wireless system 6 corresponding to the second frequency band are thereby defined as different wireless systems 5 and 6 whose frequency bands are close to each other.

[Placement of First and Second Antennas 7 and 13]

In the communication device of the present embodiment, the positional relationship between the first antenna 7 mounted on the first board 8 and the second antenna 13 mounted on the second board 14 are set, such that an imaginary surface (not shown in the figures) extending along the first antenna 7 and an imaginary surface (not shown in the figures) extending along the second antenna 13 cross on their extension lines. It should be noted that the concept of crossing includes a positional relationship in which they are orthogonal at an angle of 90° and a positional relationship in which they cross at an angle of 90° or less (not including 0°).

In the figures, as an example, the positional relationship between the first board 8 and the second board 14 are set, such that an imaginary surface (not shown in the figures) extending along the first board 8 and an imaginary surface (not shown in the figures) extending along the second board 14 cross on their extension lines (for example, at an angle of 90°). In this case, for example, the flat first board 8 on which the first antenna 7 is mounted and the flat second board 14 on which the second antenna 13 is mounted are prepared. The above-described front face 3a of the cover unit 2 (base 2a) is formed as a flat surface. An attachment surface 4c (see FIG. 1) orthogonal to the front face 3a of the base 2a is formed on the inner face 4b of the cover unit 2 (cover 2b). The attachment surface 4c is formed as a flat surface.

In such a configuration, the first board 8 is placed on the front face 3a of the base 2a. For example, the first board 8 is glued or screwed on the front face 3a of the base 2a. The second board 14 is placed on the attachment surface 4c of the cover 2b. For example, the second board 14 is glued or screwed on the attachment surface 4c of the cover 2b. Here, if the size (for example, the overall width) of the second board 14 exceeds the attachment surface 4c, the second board 14 may be bent along the inner face 4b of the cover 2b.

Figure 4:
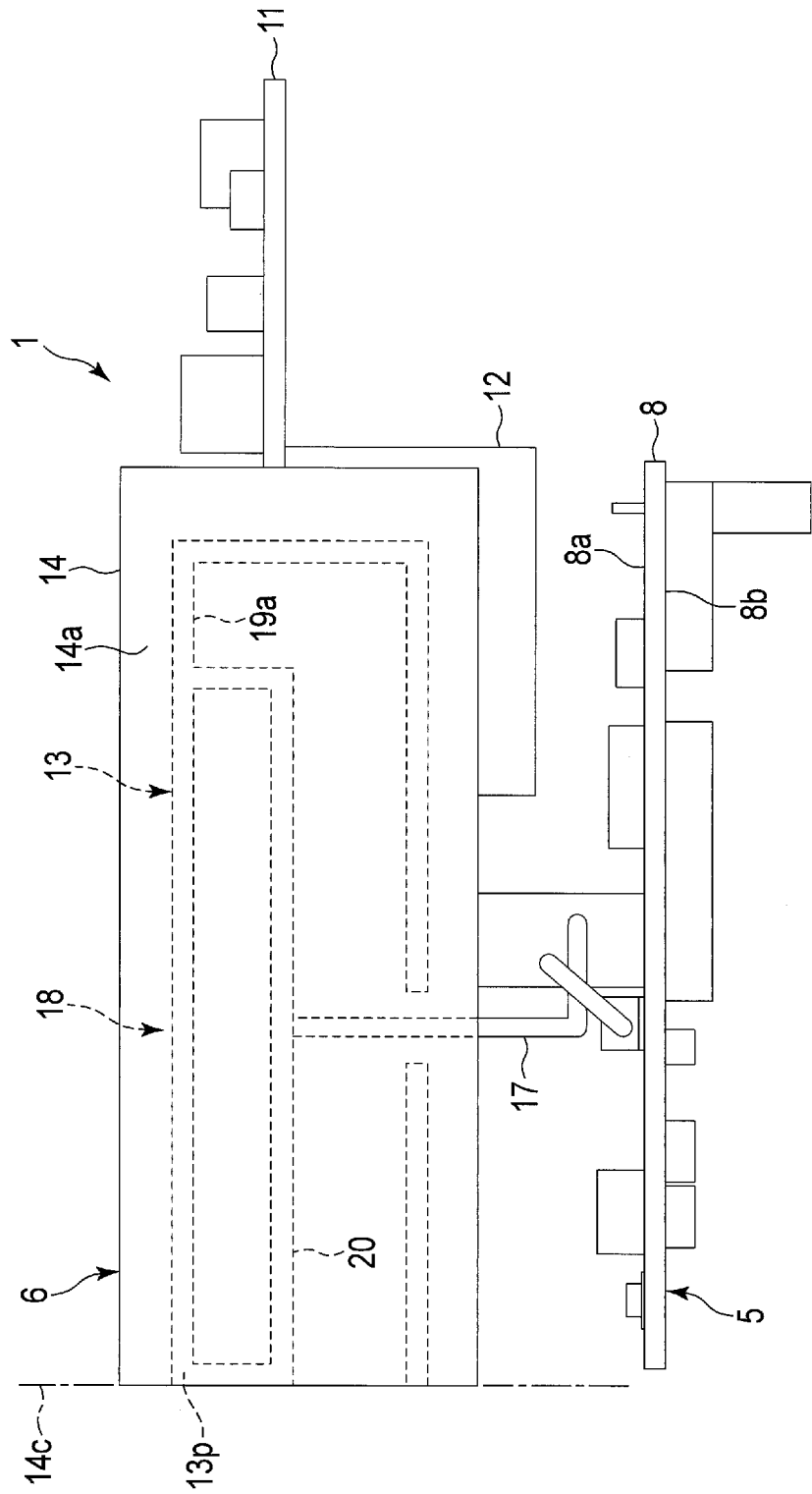
FIG. 4 is an exemplary side view of the wireless systems in a direction indicated by arrow F4 of FIG. 2.
Figure 6:
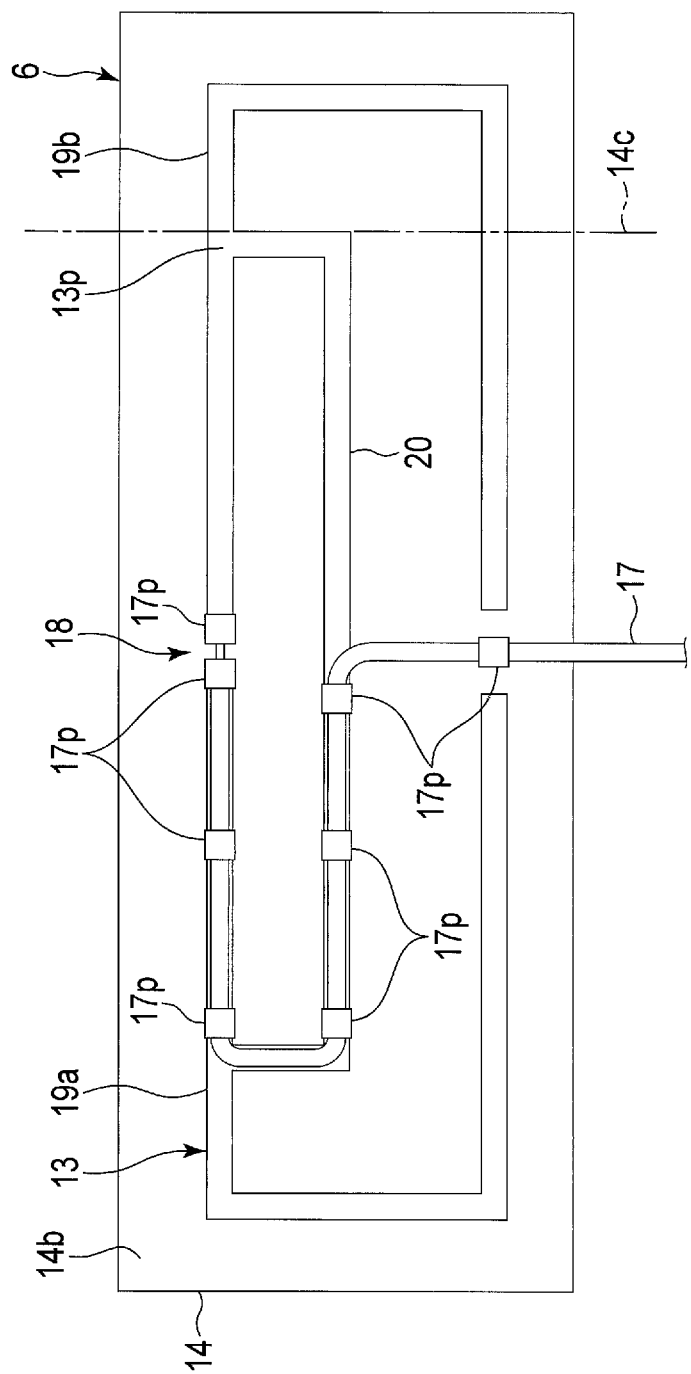
FIG. 6 is an exemplary plan view showing a configuration of an inner face of a second board of FIG. 1.

In the figures, as an example, the second board 14 is bent at an angle of approximately 90° along a bend line 14c indicated by an alternate long and short dashed line (see FIG. 4 and FIG. 6). The bend line 14c is defined along the outside of a joint 13p between a second antenna portion 19b, which will be described later, and a loop portion 20, which will be described later (the opposite side to a second feed point 18, which will be described later). The bend line 14c extends orthogonally to the second antenna portion 19b and the loop portion 20.

If the bend line 14c is set closer to the second feed point 18 than this position, a current flowing through a high-frequency cable 17, which will be described later, becomes large. As a result, the case in which the antenna performance is affected is assumed. On the other hand, if the bend line 14c is set outside the joint 13p as described above, the current flowing through the high-frequency cable 17 becomes small. As a result, the antenna performance can be kept good.

The first board 8 and the second board 14 are thereby placed to have a positional relationship in which the imaginary surface (not shown in the figures) extending along the first board 8 and the imaginary surface (not shown in the figures) extending along the second board 14 are orthogonal to (cross) each other on their extension lines. As a result, the first antenna 7 and the second antenna 13 can be placed to have a positional relationship in which the imaginary surface (not shown in the figures) extending along the first antenna 7 and the imaginary surface (not shown in the figures) extending along the second antenna 13 are orthogonal to (cross) each other on their extension lines. It should be noted that the above-described sub-board (third board) 11 is placed in a support frame (not shown in the figures) standing on the front face 3a side of the base 2a.

Here, in the above-described placement configuration of the first board 8 and the second board 14, the first board 8 comprises a surface 8a and a back face 8b facing each other. The first board 8 is placed, such that its surface 8a faces the inner face 4b of the cover 2b. The second board 14 is placed to leave a space on the surface 8a side of the first board 8. At this time, the first board 8 is placed, such that its back face 8b faces the front face 3a of the base 2a. As described above, the back face 3b side of the base 2a has a hollow three-dimensional structure. Therefore, in a state in which the first board 8 is placed on the front face 3a of the base 2a, a clearance of the above-described distance 2L (approximately 40 to 50 mm) is secured on the back face 8b side of the first board 8.

In this case, the first and second antennas 7 and 13 placed on the front face 3a side of the base 2a can be separated from the attachment place of the cover unit 2. The first and second antennas 7 and 13 can be thereby less affected by a communication (radio) failure from the above-described attachment place of the cover unit 2. As a result, the communication performance of the first and second antennas 7 and 13 can be maintained.

Moreover, the second antenna 13 is preferably placed at a position avoiding at least an area occupied by the first antenna 7 in the whole area of the first board 8. In the figures, as an example, the second board 14 is placed at a position apart from (position avoiding) the whole area of the first board 8. In other words, the second board 14 is placed, such that the first board 8 and the second board 14 do not overlap orthogonally to the surface 8a and the back face 8b of the first board 8.

Thus, the second antenna 13 mounted on the second board 14 can be placed at a position avoiding the first antenna 7 mounted on the first board 8. In other words, the second antenna 13 can be placed at a position avoiding the whole area of the first board 8. The mutual radio interference between the first antenna 7 and the second antenna 13 can be thereby prevented or reduced. As a result, the communication performance of the first and second antennas 7 and 13 can be maintained or improved.

In the positional relationship between the first antenna 7 and the above-described sub-board (third board) 11, the first antenna 7 is placed at an area avoiding the sub-board (third board) 11. Moreover, in the positional relationship between the second antenna 13 and the sub-board (third board) 11, the second antenna 13 and the sub-board (third board) 11 are placed to have a positional relationship in which an imaginary surface (not shown in the figures) extending along the second antenna 13 and an imaginary surface (not shown in the figures) extending along the sub-board (third board) 11 cross (are orthogonal to) each other on their extension lines.

[Configuration of First and Second Antennas 7 and 13]

The first antenna 7 is mountable on either of the surface 8a and the back face 8b of the first board 8. In the figures, as an example, the first antenna 7 is mounted on the surface 8a of the first board 8 (printed circuit board). On the surface 8a of the first board 8, the above-described first wireless circuit 9 and a ground 15 are provided.

To maintain the antenna performance of the first antenna 7 having a wide frequency band, it is necessary to secure the wide ground 15. Thus, as the ground 15 of the first antenna 7, a wide ground pattern 15p (see FIG. 5) preformed on the first board 8 is used as it is. The first antenna 7 is electrically connected to the first wireless circuit 9 via the first feed point 16. The first wireless system 5, which can exercise the function of the first antenna 7, can be thereby realized.

The second antenna 13 is mountable on either of an outer face 14a and an inner face 14b of the second board 14. Here, as an example, the second antenna 13 is mounted on the inner face 14b of the second board 14 (printed circuit board). The inner face 14b is a face facing the above-described first board 8. The outer face 14a is a face facing the inner face 14b. As the second antenna 13, for example, a dipole antenna (see FIG. 6) is preferably applied. The second antenna 13 is connected to the first board 8 via the high-frequency cable 17. The second wireless system 6, which can exercise the function of the second antenna 13, can be thereby realized without providing a ground.

As shown in FIG. 6, the dipole antenna (second antenna) 13 comprises the second feed point 18, two second antenna portions 19a and 19b, and the loop portion 20. The second antenna portions 19a and 19b extend to both sides from the second feed point 18. The loop portion 20 is connected to both the second antenna portions 19a and 19b, between which the second feed point 18 is located.

The high-frequency cable 17 extends from a middle of the loop portion 20 along one of the second antenna portions 19a. An extending end of the high-frequency cable 17 is electrically connected to the second feed point 18. In this state, the high-frequency cable 17 is electrically joined to the dipole antenna 13 at a plurality of places. As a joining method, for example, soldering can be applied. Places for soldering (that is, joints 17p) and the number of places are set according to, for example, the shape and size of the dipole antenna 13, etc., and thus are not particularly limited herein.

Incidentally, if the high-frequency cable 17 is not joined to the dipole antenna (second antenna) 13, that is, the high-frequency cable 17 is in a free state in which it can move freely, a leakage current flowing through the high-frequency cable 17 may produce unnecessary resonance. Moreover, the high-frequency cable 17 may function as an antenna, and thus be easily subject to high-frequency noise produced from peripheral components. Thus, the antenna's performance cannot be maintained.

On the other hand, according to the joining method of the present embodiment, the high-frequency cable 17 can be rested (fixed) on the dipole antenna (second antenna) 13. In other words, the dipole antenna (second antenna) 13 and the high-frequency cable 17 can be prevented from moving relatively. The antenna characteristic of the dipole antenna (second antenna) 13 can be thereby maintained. As a result, specific low-power wireless communication (for example, 869 MHz) can be stabilized.

[Configuration of Third Antenna]

As shown in FIG. 5, the communication device 1 may further comprise a third wireless system 21 in addition to the first and second wireless systems 5 and 6. The third wireless system 21 can be installed in the surface 8a of the first board 8. The third wireless system 21 conforms to the ISM band (2.4 GHz).

The third wireless system 21 is formed on the surface 8a of the first board 8, and comprises a third antenna 22 and a third wireless circuit 23. As a ground of the third antenna 22, the ground 15 (ground pattern 15p) preformed on the first board 8 is used as it is. The third antenna 22 uses a third frequency band. The third antenna 22 is mounted on the surface 8a of the first board 8. The third antenna 22 is electrically connected to the third wireless circuit 23 via a third feed point 24.

The third wireless circuit 23 is provided on the surface 8a of the first board 8. The third wireless circuit 23 uses the third frequency band as an operating frequency. The third frequency band is set in a range differing from the first frequency band and the second frequency band. The third frequency band conforms to the ISM band (2.4 GHz).

In this case, a space between the third antenna 22 and the first antenna 7 is preferably set to be greater than or equal to a half-wavelength of the third frequency band. The space refers to a linear distance or the minimum distance between the antennas. For example, the space can be defined as a linear distance (minimum distance) between the first feed point 16 of the first antenna 7 and the third feed point 24 of the third antenna 22. In this case, the space between the feed points 16 and 24 is preferably set to be greater than or equal to a half-wavelength of the third frequency band.

In such a placement configuration, the isolation of the first antenna 7 and the third antenna 22 from each other can be maintained. The mutual radio interference between the first antenna 7 and the third antenna 22 can be thereby prevented or reduced. As a result, the communication performance of the first and third antennas 7 and 22 can be maintained or improved.

[Advantages of One Embodiment]

According to the present embodiment, the first antenna 7 of the first board 8 and the second antenna 13 of the second board 14 cross (are orthogonal to) each other. Specifically, the positional relationship between the first antenna 7 and the second antenna 13 is set, such that the imaginary surface (not shown in the figures) extending along the first antenna 7 and the imaginary surface (not shown in the figures) extending along the second antenna 13 cross (are orthogonal to) each other on their extension lines. The mutual radio interference between the first antenna 7 and the second antenna 13 can be thereby prevented or reduced. As a result, the communication performance of the first and second antennas 7 and 13 can be maintained or improved.

According to the present embodiment, the first board 8 on which the first antenna 7 is mounted and the second board 14 on which the second antenna 13 is mounted cross (are orthogonal to) each other. Specifically, the positional relationship between the first board 8 and the second board 14 is set, such that the imaginary surface (not shown in the figures) extending along the first board 8 and the imaginary surface (not shown in the figures) extending along the second board 14 cross (are orthogonal to) each other. The different wireless systems 5 and 6 whose frequency bands are close to each other can be thereby mounted at high density. As a result, the communication device 1 can be made smaller.

According to the present embodiment, the back face 3b side of the base 2a has a hollow three-dimensional structure. In this case, the first and second antennas 7 and 13 placed on the front face 3a side of the base 2a can be separated from the attachment place of the cover unit 2. The first and second antennas 7 and 13 can be thereby less affected by a communication (radio) failure from the attachment place. As a result, the communication performance of the first and second antennas 7 and 13 can be maintained.

According to the present embodiment, the second antenna 13 is placed at a position avoiding at least the area occupied by the first antenna 7 in the whole area of the first board 8. The mutual radio interference between the first antenna 7 and the second antenna 13 can be thereby prevented or reduced. As a result, the communication performance of the first and second antennas 7 and 13 can be maintained or improved.

According to the present embodiment, as a ground of the first antenna 7 having a wide frequency band, the wide ground 15 (ground pattern 15p) preformed on the first board 8 is used as it is. The antenna performance of the first antenna 7 can be thereby maintained. Moreover, it is unnecessary to prepare a ground of the first antenna 7 separately. The communication device 1 can be thereby made further smaller.

According to the present embodiment, a dipole antenna is applied as the second antenna 13. The dipole antenna does not need a ground. The degree of freedom of the mounting position of the second antenna 13 can be thereby improved.

According to the present embodiment, in the second antenna (dipole antenna) 13, the high-frequency cable 17 extends from a middle of the loop portion 20 along one of the second antenna portions 19a. In this state, the high-frequency cable 17 is electrically joined (soldered) to the dipole antenna 13 at a plurality of places. In this case, the high-frequency cable 17 can be rested (fixed) on the dipole antenna (second antenna) 13. In other words, the dipole antenna (second antenna) 13 and the high-frequency cable 17 can be prevented from moving relatively. The antenna characteristic of the dipole antenna (second antenna) 13 can be thereby maintained. As a result, specific low-power wireless communication (for example, 869 MHz) can be stabilized.

According to the present embodiment, the communication device 1 further comprising the third wireless system 21 in addition to the first and second wireless systems 5 and 6 can be realized. The space between the third antenna 22 and the first antenna 7 is set to be greater than or equal to a half-wavelength of the third frequency band. In this case, the isolation of the first antenna 7 and the third antenna 22 from each other can be maintained. The mutual radio interference between the first antenna 7 and the third antenna 22 can be thereby prevented or reduced. As a result, the communication performance of the first and third antennas 7 and 22 can be maintained or improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device in which different wireless systems whose frequency bands are close to each other are installed, comprising:
    a first antenna provided for a first wireless system, the first antenna using a first frequency band; and
    a second antenna provided for a second wireless system, the second antenna using a second frequency band,
    wherein the first frequency band is set in a range wider than the second frequency band,
    the second frequency band is included in a part of the range of the first frequency band,
    the first wireless system comprises:
        a first board having a surface on which the first antenna is mounted; and
        a first wireless circuit provided on the first board, the first wireless circuit using the first frequency band as an operating frequency,
    the second wireless system comprises:
        a second board having an inner face on which the second antenna is mounted; and
        a second wireless circuit using the second frequency band as an operating frequency,
    an imaginary surface extending along the surface of the first board and an imaginary surface extending along the inner face of the second board cross each other on extension lines of the first board and the second board,
    in a placement configuration of the first board and the second board, the first board comprises the surface and a back face facing each other,
    the second board is placed to leave a space on a surface side of the first board, and
    a clearance for maintaining communication performance is secured on a back face side of the first board.

2. The communication device of claim 1, wherein the second antenna is placed at a position avoiding at least an area occupied by the first antenna in a whole area of the first board.

3. The communication device of claim 2, wherein the second antenna is placed at a position avoiding the whole area of the first board.

4. The communication device of claim 2, further comprising a third board facing the first board,
    wherein the first antenna is placed in an area avoiding the third board.

5. The communication device of claim 2, further comprising a third board facing the first board,
    wherein the second antenna and an imaginary surface extending along the third board cross each other.

6. The communication device of claim 1, wherein the second wireless system comprises a high-frequency cable connected to the second antenna, and
    the second antenna is a dipole antenna.

7. The communication device of claim 6, wherein the dipole antenna comprises:
    a second feed point;
    two second antenna portions extending from the second feed point; and
    a loop portion connected to both the second antenna portions, between which the second feed point is located,
    wherein the high-frequency cable extends from the loop portion along one of the second antenna portions to be connected to the second feed point, while being electrically joined to the dipole antenna at a plurality of places.

8. The communication device of claim 1, comprising a third antenna mounted on the first board, the third antenna using a third frequency band,
    wherein the third frequency band is set in a range different from the first frequency band and the second frequency band, and
    a space between the third antenna and the first antenna is set to be greater than or equal to a half-wavelength of the third frequency band.

9. The communication device of claim 8, wherein the first antenna comprises a first feed point and a first antenna portion extending from the first feed point,
    the third antenna comprises a third feed point and a third antenna portion extending from the third feed point, and
    a space between the first feed point and the third feed point is set to be greater than or equal to the half-wavelength of the third frequency band.

10. A smart meter comprising the communication device of claim 1,
    and being equipped with a power measurement function.

* * * * *